United States Patent
Yang et al.

(10) Patent No.: US 12,497,246 B2
(45) Date of Patent: Dec. 16, 2025

(54) LOAD-BEARING SUPPORT PLATE, CHAIN STRUCTURE, AND CONVEYOR BELT STRUCTURE INCORPORATING THEM

(71) Applicant: Square Technology Group Co., Ltd, Jiangsu (CN)

(72) Inventors: Xiaoyan Yang, Nantong (CN); Xiaohua Lou, Nantong (CN); Pu Chen, Nantong (CN); Zhong Pu, Nantong (CN); Wenbo Ai, Nantong (CN); Yafei Shan, Nantong (CN)

(73) Assignee: SQUARE TECHNOLOGY GROUP CO., LTD, Nantong (CN)

( * ) Notice: Subject to any disclaimer, the term of this patent is extended or adjusted under 35 U.S.C. 154(b) by 59 days.

(21) Appl. No.: 18/608,034

(22) Filed: Mar. 18, 2024

(65) Prior Publication Data
US 2024/0317504 A1    Sep. 26, 2024

(30) Foreign Application Priority Data
Mar. 22, 2023  (CN) .......................... 202320599801.9

(51) Int. Cl.
*B65G 41/00*  (2006.01)
*B65G 21/18*  (2006.01)

(52) U.S. Cl.
CPC ........... *B65G 41/006* (2013.01); *B65G 21/18* (2013.01)

(58) Field of Classification Search
CPC .............................. B65G 21/18; B65G 2207/24
USPC ......................................................... 198/778
See application file for complete search history.

(56) References Cited

U.S. PATENT DOCUMENTS

| | | | | |
|---|---|---|---|---|
| 2004/0011627 A1* | 1/2004 | Palmaer | ............... | B65G 17/086 198/778 |
| 2005/0092585 A1* | 5/2005 | Nelson | ................... | B65G 21/18 198/848 |
| 2013/0270074 A1* | 10/2013 | Malmberg | ............. | B65G 21/18 198/850 |
| 2014/0021020 A1* | 1/2014 | Bogle | ................... | B65G 17/40 198/850 |

FOREIGN PATENT DOCUMENTS

| | | | | |
|---|---|---|---|---|
| CN | 107438572 A | * | 12/2017 | ............. B65G 17/40 |
| WO | WO-9738925 A1 | * | 10/1997 | ........... B65G 17/064 |
| WO | 2012084405 A1 | * | 6/2012 | ............. B65G 21/18 |
| WO | WO-2021262640 A1 | * | 12/2021 | ............. B65G 23/14 |

* cited by examiner

*Primary Examiner* — James R Bidwell
(74) *Attorney, Agent, or Firm* — Birch, Stewart, Kolasch & Birch, LLP

(57) ABSTRACT

A load-bearing support plate, chain structure, and a conveyor belt structure incorporating them are provided. The load-bearing support plate includes a first panel, a second panel, and a transition panel for connecting the first panel with the second panel; the first panel is offset in a first direction relative to the second panel, and at least one reinforcing rib is provided on the first panel, the reinforcing rib extending upwards from the bottom of the first panel to the upper edge of the first panel and forming a bearing surface with the top surface of the first panel. By forming the first panel into a curved shape with the use of reinforcing ribs, the overall support capability is enhanced.

11 Claims, 5 Drawing Sheets

LOAD-BEARING SUPPORT PLATE, CHAIN STRUCTURE, AND CONVEYOR BELT STRUCTURE INCORPORATING THEM

CROSS REFERENCE TO RELATED APPLICATIONS

This application claims priority for the CN patent application No. 202320599801.9 filed on Mar. 22, 2023, which is hereby expressly incorporated by reference into the present application.

TECHNICAL FIELD OF THE PRESENT INVENTION

This application relates to the food processing technology industry, especially a load-bearing support plate, chain structure, and a conveyor belt structure incorporating them.

BACKGROUND OF THE PRESENT INVENTION

In the food processing industry, rapid freezing or heating is often necessary, requiring the use of conveyor belts for transportation.

Currently, existing conveyor belts can move back and forth in a straight line, or be wound into circular or spiral structures. When arranged in a spiral structure, the bottom conveyor belt is supported and moved by the driving system, with the rest of the belts spirally stacked on the layer below each one. The support plates of the upper and lower belts remain relatively still and laterally aligned. When there are too many layers or the load is too heavy, the support plates can bend and deform. As the belts move in a spiral structure, the bottom belt transitions from straight to circular motion, creating inward bending stress on the support plates, which can lead to deformation. Additionally, when the upper and lower belts are stacked, the existing conveyor belts' support plates directly contact the rods, gradually wearing them down over time and increasing the risk of breakage.

SUMMARY OF THE PRESENT INVENTION

The technical problem this application aims to solve is to provide a load-bearing support plate, chain structure, and a conveyor belt structure incorporating them, which have a high load capacity, are not prone to deformation, and do not wear down rods.

The present application provides a load-bearing support plate, characterized in that it comprises a first panel, a second panel, and a transition panel for connecting the first panel with the second panel; the first panel is offset in a first direction relative to the second panel, at least one reinforcing rib provided on the first panel, the reinforcing rib extending upwards from the bottom of the first panel to the upper edge of the first panel and forming a bearing surface with the top surface of the first panel.

As a further improvement of an embodiment of the present application, wherein the reinforcing rib is extruded from one side of the first panel in the first direction and forms a protrusion on the other side of the first panel.

As a further improvement of an embodiment of the present application, wherein at least one heat dissipation hole is provided on one or more of the first panel, the second panel, and the transition panel.

As a further improvement of an embodiment of the present application, further comprising at least two connectors, the connectors being provided on one or more of the first panel, the second panel, and the transition panel.

As a further improvement of an embodiment of the present application, wherein at least one of the connectors is provided at the bottom of the first panel and at least one of the connectors is provided at the bottom of the transition panel.

As a further improvement of an embodiment of the present application, wherein a long slot hole is provided on the second panel, one end of the long slot hole being close to the first panel and the other end being far from the first panel.

As a further improvement of an embodiment of the present application, wherein a support leg structure is provided at the bottom of the first panel, the support leg structure comprises a support panel extending from the lower edge of the first panel in the first direction, and a limit panel extending downwards from the support panel.

As a further improvement of an embodiment of the present application, wherein a support leg structure is provided at the bottom of the first panel, the support leg structure comprising a support panel extending from the lower edge of the first panel in the first direction, a limit panel extending downwards from the support panel, and a connecting panel connected to the limit panel; a contact panel is provided on the connecting panel, the number of contact panels being consistent with the number of connectors; the contact panels are designed to abut against rods inserted into the connectors.

As a further improvement of an embodiment of the present application, wherein a bottom edge panel extends downwardly and inclines from the lower edge of the second panel, the bottom edge panel tilting towards the second direction, which is opposite to the first direction.

The present application provides a chain structure, characterized in that it comprises two load-bearing support plates, with the two load-bearing support plates set oppositely and at least two rods fixedly provided between the two load-bearing support plates.

The present application provides a conveyor belt structure, characterized in that it is assembled from several chain structures and forms a closed-loop structure combining a spiral stacking form with a linear form; in the spiral stacking form, in two load-bearing support plates adjacent to each other at the top and bottom, the upper edge of the load-bearing support plate located below supports the lower edge of the load-bearing support plate located above in two adjacent load-bearing support plates.

The beneficial effects of this application are: by forming the first panel into a curved shape with the use of reinforcing ribs, the overall support capability is enhanced. Also, by extending the reinforcing ribs to the upper edge of the first panel, the upper edge of the support plate below becomes curved, offering a larger contact area in the thickness direction, thereby improving the stability of the spiral stacking motion. During use, the support plates do not contact the rods, thus not causing wear and enhancing the lifetime or the rods.

DETAILED DESCRIPTION OF THE PRESENT INVENTION

Figure 1:
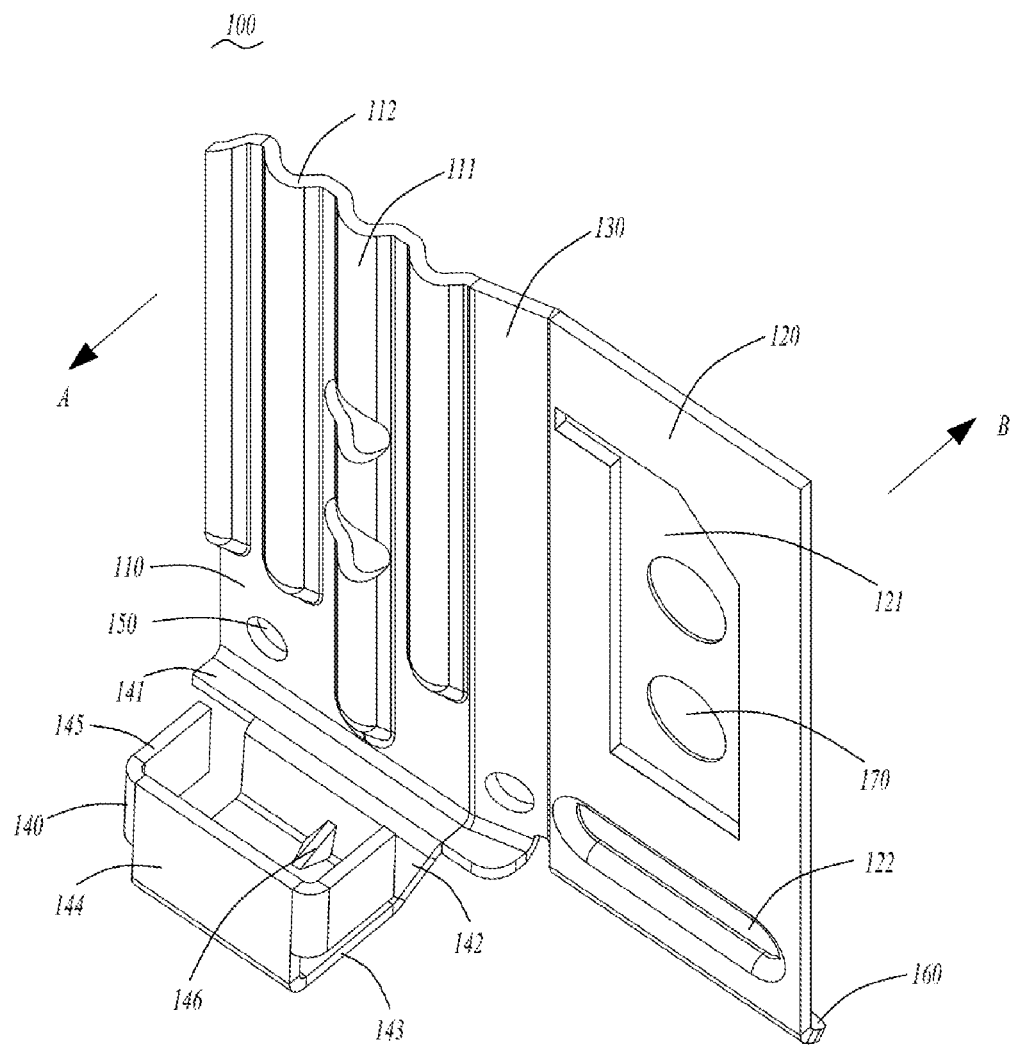
FIG. 1 is a schematic structure diagram of the load-bearing support plate of this application.

The technical solutions of this application will be clearly and completely described in conjunction with the accompanying drawings. It is apparent that the described embodiments are part of the embodiments of this application, rather than all of them. All other embodiments obtained by those skilled in the art based on the embodiments in this application, without making creative efforts, fall within the protection scope of this application.

In the description of this application, it should be noted that terms like "center," "upper," "lower," "left," "right," "vertical," "horizontal," "inner," "outer," and other indications of direction or positional relationships are based on the orientations or positional relationships shown in the drawings. These are only for the convenience of describing this application and simplifying the description, and do not indicate or imply that the device or element referred to must have a particular orientation, be constructed and operated in a particular orientation, and thus should not be considered as limiting this application. Furthermore, terms like "first," "second," and "third" are used for descriptive purposes only and should not be construed as indicating or implying relative importance.

In the description of this application, it is also to be noted that, unless otherwise explicitly specified or limited, terms such as "mounted," "connected," and "connected" should be broadly understood. For example, they can be fixedly connected, detachably connected, or integrally connected; they can be mechanically connected, or electrically connected; they can be directly connected or indirectly connected through intermediates, or the internal connection of two elements. Those skilled in the art can understand the specific meanings of the above terms in this application according to specific situations. In addition, the technical features involved in different embodiments of this application described below can be combined with each other as long as they do not conflict.

Figure 2:
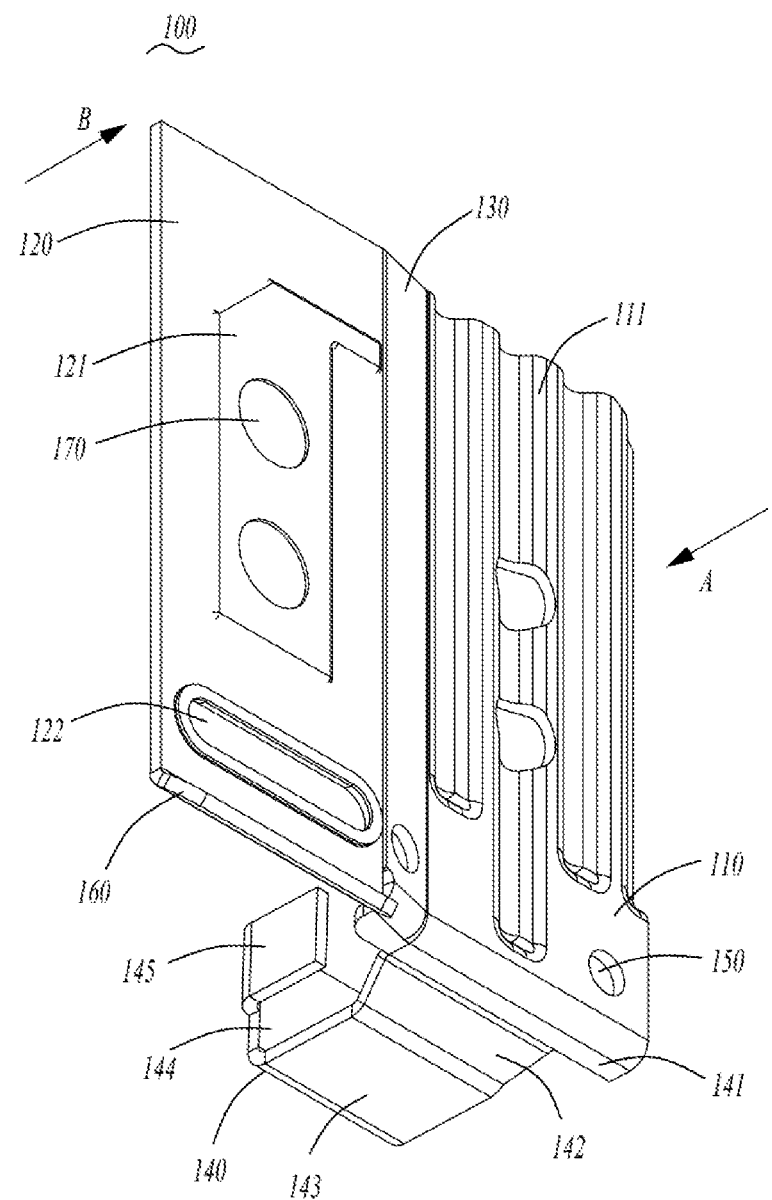
FIG. 2 is another schematic structure diagram of the load-bearing support plate of this application.

As shown in FIGS. 1 and 2, a load-bearing support plate 100 comprises a first panel 110, a second panel 120, and a transition panel 130 for connecting the first panel 110 to the second panel 120. The first panel 110 is offset in a first direction (as shown in direction A in the figure) relative to the second panel 120, the offset distance ranges from t to 2t, where t is the thickness of the load-bearing support plate 100. Overall, the first panel 110 and the second panel 120 are in different planes. At least one reinforcing rib 111 is provided on the first panel 110, the reinforcing rib 111 extend upwards from the bottom of the first panel 110 to the upper edge and forming a bearing surface 112 with the top surface of the first panel 110. The thickness of the bearing surface 112 is greater than that of the first panel 110, the part of the bearing surface 112 at the upper edge being relatively wider, which not only strengthens the support strength of the first panel 110 but also ensures the stability of the load-bearing support plate 100 above during support. The misalignment between the first panel 110 and the second panel 120 provides misaligned space for the stacking of the load-bearing support plate 100 and further enhances bending resistance of the load-bearing support plate 100.

Based on the aforementioned reinforcing ribs 111, in this application, the reinforcing ribs 111 are formed by extruding from one side of the first panel 110 to the other side, creating a bulge that causes the first panel 110 to be overall curved. The height of the bulge is approximately the thickness (t) of the first panel 110. There are three reinforcing ribs 111 set up evenly distributed, the length of the middle reinforcing rib 111 is greater than the length of the two side reinforcing ribs 111, the length of the two side reinforcing ribs 111 are ¾ the length of the middle reinforcing rib 111. The direction of the bulge of the reinforcing ribs 111 is in the first direction, during assembly, the first direction is from near to far from the conveyor belt.

Figure 3:
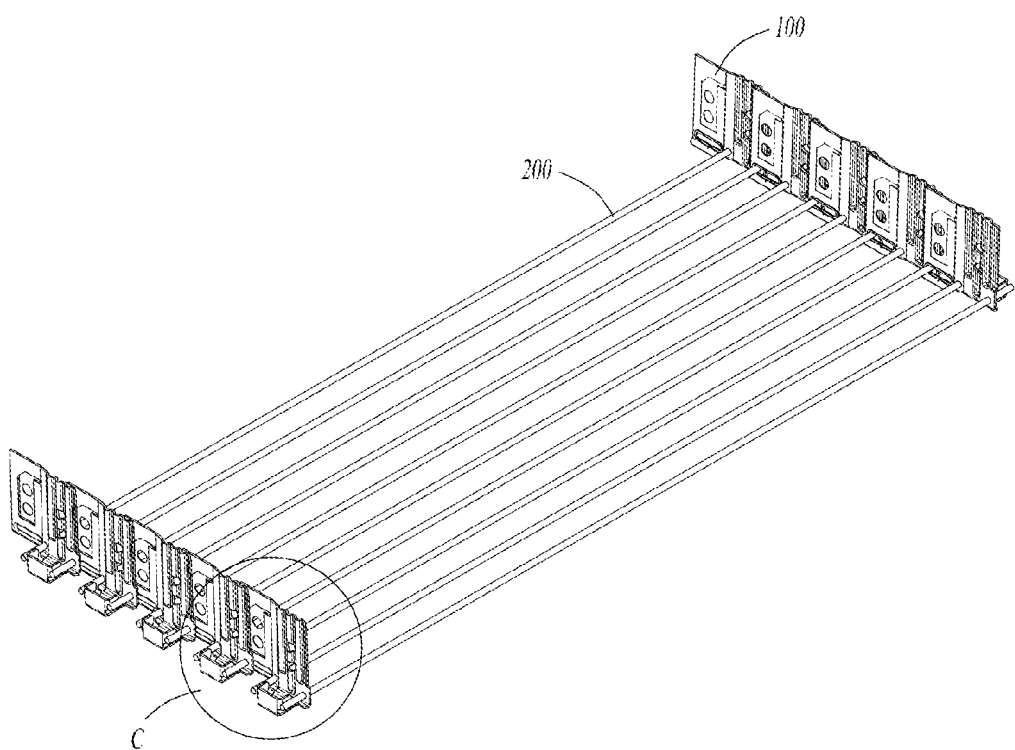
FIG. 3 is a schematic assembly diagram of the chain body structure of this application.
Figure 4:
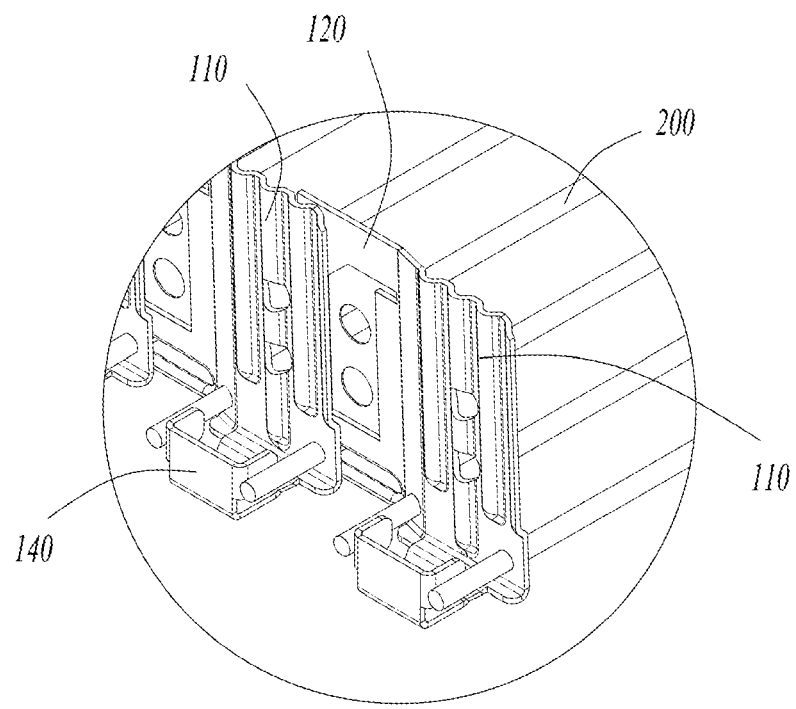
FIG. 4 is an enlarged structural diagram of part C in FIG. 3.
Figure 5:
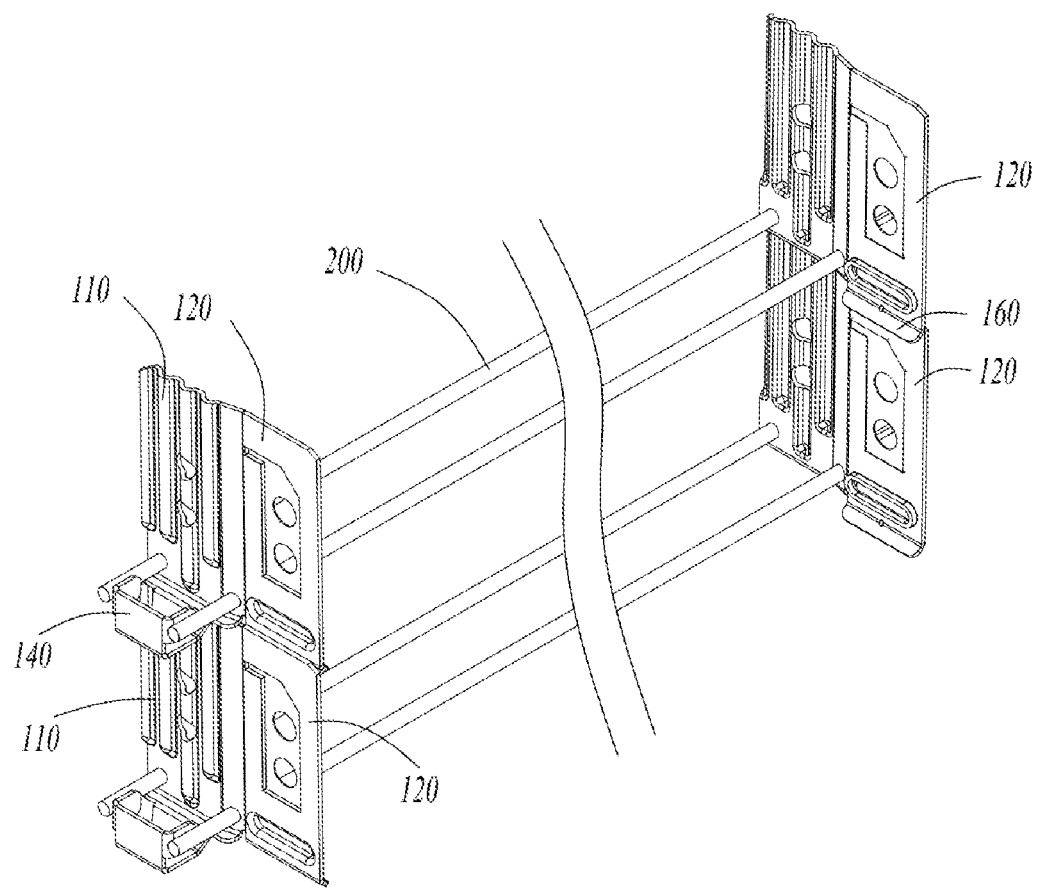
FIG. 5 is a schematic installation diagram of the load-bearing support plate under spiral stacking according to this application.

The load-bearing support plate 100 also comprises at least two connectors 150 used to fix rods 200 (as shown in FIGS. 3-5), the central axis of the rods 200 parallel to the first direction. The connectors 150 can be positioned on one or more of the first panel 110, the second panel 120, and the transition panel 130 to form a fit. Further, at least one connector 150 is located at the bottom of the first panel 110, and at least one connector 150 is located at the bottom of the transition panel 130. Furthermore, in this application, there are two connectors 150, and the distance between them is roughly equal to the width of the first panel 110. Due to the transition panel 130 being at a certain angle, the connectors 150 on it are inclined relative to the transition panel 130, thus increasing the contact area with the rod 200, reducing stress at this point, and increasing the welding surface, making the conveyor belt more securely fixed.

An extruded component 121 is formed on the second panel 120 towards the second direction (as shown in direction B in the figure), the extruded component 121 enhancing the bending resistance of the second panel 120. The coverage area of the extruded component 121 is at least 20%-50% of the second panel 120, the protrusion distance not exceeding the thickness (t) of the second panel 120. Long slot holes 122 are provided at the bottom of the second panel 120, one end of the long slot holes 122 close to the first panel 110 and the other end far from the first panel 110. In this application, the orientation of the long slot holes 122 is set along the direction of conveyor belt movement. A further preferred option is that the orientation of the long slot holes 122 is parallel to the upper edge of the second panel 120. As it spirals upwards, the motion path of the load-bearing support plate 100 on the outside is greater than that of the load-bearing support plate 100 on the inside. The rods 200 are inserted into the long slot holes 122 and can slide within them, compensating for the inconsistency in the motion paths on both sides through this sliding structure arrangement.

A support leg structure 140 is provided at the bottom of the first panel 110. This support leg structure 140 comprises a support panel 141 extending from the lower edge of the first panel 110 in the first direction and a limit panel 142 extending downward from the support panel 141. The bottom surface of the support panel 141 is for contacting the bearing surface 112 of the first panel 110 in the load-bearing support plate 100 below, serving a supporting role. The limit panel 142 restricts the upper edge of the first panel 110 from moving away from the conveyor belt direction. Furthermore, the limit panel 142 is set at an incline, tilting in the first direction and downwards, forming a corresponding guiding effect. The upper edge of the first panel 110 contacts the limit panel 142 and enters the support panel 141 due to the inclined guidance, ensuring stability and alignment of the conveyor belt operation, allowing it to quickly enter the designated position.

Additionally, the support leg structure 140 comprises a connecting panel connected to the limit panel 142, the connecting panel comprising a horizontal section 143 and a vertical section 144. The horizontal section 143 is set in the first direction, with the vertical section 144 extending upwards perpendicular to the first direction. Contact panels 145 are placed on the vertical section 144, the number of contact panels 145 being consistent with the number of connectors 150. The contact panels 145 can abut against the installed rods 200, or the rods 200 can be directly welded to the contact panels 145. In this application, there are two rods 200, and accordingly, two contact panels 145 are set up, extending from both sides of the vertical section 144 in the second direction, making the contact panels 145 contact or weld to the cylindrical surface of rods 200.

Reinforcing grooves 146 are set at the junction of the horizontal section 143 and the vertical section 144, and at the boundary between the horizontal section 143 and the limit panel 142. The reinforcing grooves 146 are formed internally by extrusion or stamping, enhancing the strength of the support leg structure 140.

A bottom edge panel 160 extends downward and inclines from the lower edge of the second panel 120, the bottom edge panel 160 tilting towards the second direction, meaning the bottom edge panel 160 tilts downward and towards the conveyor belt direction. Reinforcing grooves are also set on the bottom edge panel 160 to increase the strength of the edge panel 160. The bottom edge panel 160, in conjunction with the upper edge of the second panel 120 on the load-bearing support plate 100 below, restricts the movement of the load-bearing support plate 100 in the second direction, i.e., restricts the movement towards the conveyor belt direction.

Based on the structure of the load-bearing support plate 100, a chain structure is designed, which can be assembled into a conveyor belt structure.

As shown in FIGS. 3 and 5, the chain structure comprises two load-bearing support plates 100 and two rods 200. The two load-bearing support plates 100 are set opposite each other. One of the rods 200 passes through the connectors 150 located on the transition panel 130 of both load-bearing support plates 100 and is welded in place. The other rod 200 passes through the connectors 150 located on the first panel 110 of both load-bearing support plates 100 and is also welded, both rods 200 are welded to the contact panels 145, thus forming a monolithic chain structure. If connectors 150 are not provided, the rods 200 can be directly welded to the corresponding positions on the load-bearing support plate 100.

Figure 7:
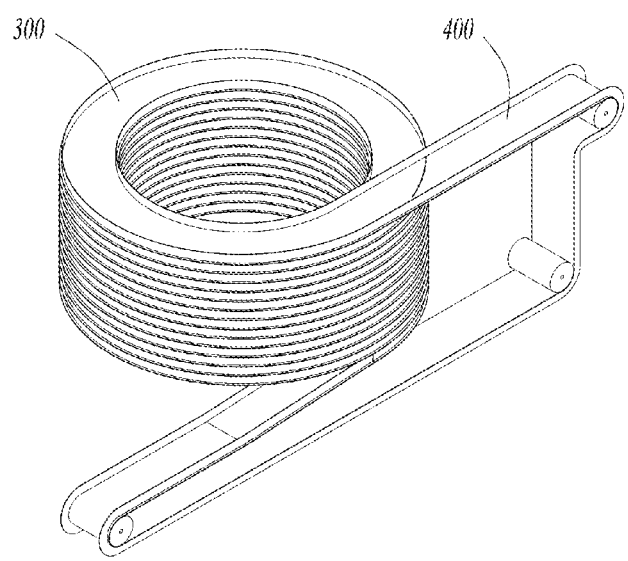
FIG. 7 is a schematic structure diagram of the conveyor belt structure of this application.

Several such chain structures are linked in series to form the corresponding conveyor belt structure. As shown in FIG. 7, this conveyor belt structure forms a closed-loop structure combining a spiral stacking form 300 with a linear form 400. In the spiral stacking form 300, in two load-bearing support plates 100 adjacent to each other at the top and bottom, the upper edge of the load-bearing support plate 100 below supports the lower edge of the load-bearing support plate 100 above (as shown in FIG. 5).

Figure 6:
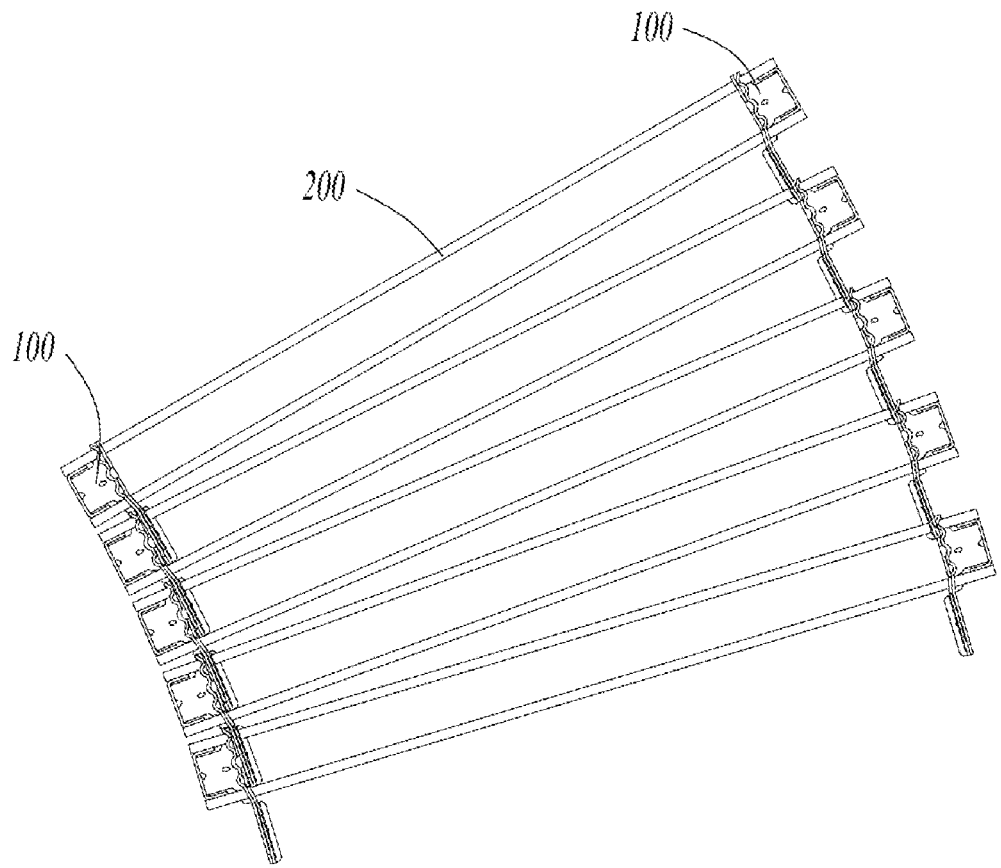
FIG. 6 is a top view schematic diagram of the spiral stacking form of this application.

As shown in FIGS. 3 and 4, during linking and installation, in two said load-bearing support plates 100 adjacent to each other, the first panel 110 of the preceding load-bearing support plate 100 partially overlaps with the second panel 120 of the following load-bearing support plate 100. Since the first panel 110 and the second panel 120 are staggered, it ensures that the first panels 110 of adjacent load-bearing support plates 100 are approximately in the same plane, and the two second panels 120 are also approximately in the same plane. At the same time, the rod 200 located on the first panel 110 of the following load-bearing support plate 100 is inserted into the long slot hole 122 of the preceding load-bearing support plate 100. The rod 200 can slide within the long slot hole 122, ensuring that in the spiral stacking form 300, as shown in FIG. 6, the load-bearing support plates 100 on the outside are in an extended state, and those on the inside are in a retracted state. In the linear form 400, the load-bearing support plates 100 on both sides are in a normal state. Therefore, this conveyor belt structure can freely switch between the linear form 400 and the spiral stacking form 300, suitable for different situations, significantly saving time and improving efficiency.

In the spiral stacking form 300, creating multiple layers of stacking with products transported on the conveyor belt, the left and right sides of the belt are closed. This can lead to difficulty in dissipating heat after heating treatments. Therefore, heat dissipation holes 170 can be set on one or more of the first panel 110, the second panel 120, and the transition panel 130 (as shown in FIGS. 1 and 2), with at least one heat dissipation hole 170 provided. In this application, the heat dissipation holes 170 are set on both the first panel 110 and the second panel 120, two heat dissipation holes 170 located on the first panel 110 and another two on the second panel 120. The heat dissipation holes 170 are set opposite to each other so that when the first panel 110 and the second panel 120 of different load-bearing support plates 100 overlap, they ensure that the two opposite heat dissipation holes 170 partially overlap, facilitating heat dissipation.

In summary, the staggered arrangement of the first panel 110 and the second panel 120 allows for easy stacking of the two load-bearing support plates 100 without affecting space utilization and maintaining neatness. The use of reinforcing ribs 111 to form the first panel 110 as a curved surface, the reinforcing ribs 111 extending upwards to the upper edge of the first panel 110, enhances the bending resistance of the first panel 110 and provides more stable support for the load-bearing support plate 100 above, improving the stability of the spiral stacking motion. During use, the load-bearing support plate 100 does not contact the rods 200, thus not causing wear to the rods 200 and extending their service life. The design of the long slot hole 122 allows for free expansion in the spiral stacking form 300 and enables free and automatic switching between the linear form 400 and the spiral stacking form 300. The provision of heat dissipation holes 170 ensures that the heat dissipation efficiency is greatly improved under the spiral stacking form 300, further enhancing product quality.

It should be emphasized that the above descriptions are merely preferred embodiments of this application and not intended to limit the application in any form. Any simple modifications, equivalent changes, and modifications made to the above embodiments based on the technical essence of this application still fall within the scope of the technical solutions of this application.

What is claimed is:
1. A load-bearing support plate, comprising: a first panel (110), a second panel (120), and a transition panel (130) for connecting the first panel (110) with the second panel (120),
wherein the first panel (110) is offset in a first direction relative to the second panel (120), and at least one reinforcing rib (111) is provided on the first panel (110), the reinforcing rib (111) extending upwards from the bottom of the first panel (110) to the upper edge of the first panel (110) and forming a bearing surface (112) with the top surface of the first panel (110), and wherein the bearing surface (112) at the upper edge is a curved surface.

2. The load-bearing support plate according to claim 1, wherein the reinforcing rib (111) is extruded from one side of the first panel (110) in the first direction and forms a protrusion on the other side of the first panel (110).

3. The load-bearing support plate according to claim 1, wherein at least one heat dissipation hole (170) is provided on one or more of the first panel (110), the second panel (120), and the transition panel (130).

4. The load-bearing support plate according to claim 1, further comprising at least two connectors (150), the connectors (150) being provided on one or more of the first panel (110), the second panel (120), and the transition panel (130).

5. The load-bearing support plate according to claim 4, wherein at least one of the connectors (150) is provided at the bottom of the first panel (110) and at least one of the connectors (150) is provided at the bottom of the transition panel (130).

6. The load-bearing support plate according to claim 1, wherein a long slot hole (122) is provided on the second panel (120), one end of the long slot hole (122) being close to the first panel (110) and the other end being far from the first panel (110).

7. The load-bearing support plate according to claim 1, wherein a support leg structure (140) is provided at the bottom of the first panel (110), the support leg structure (140) comprises a support panel (141) extending from the lower edge of the first panel (110) in the first direction, and a limit panel (142) extending downwards from the support panel (141).

8. The load-bearing support plate according to claim 4, wherein a support leg structure (140) is provided at the bottom of the first panel (110), the support leg structure comprising a support panel (141) extending from the lower edge of the first panel (110) in the first direction, a limit panel (142) extending downwards from the support panel (141), and a connecting panel connected to the limit panel (142); a contact panel (145) is provided on the connecting panel, the number of contact panels (145) being consistent with the number of connectors (150); the contact panels (145) are designed to abut against rods (200) inserted into the connectors (150).

9. The load-bearing support plate according to claim 1, wherein a bottom edge panel (160) extends downwardly and inclines from the lower edge of the second panel (120), the bottom edge panel (160) tilting towards the second direction, which is opposite to the first direction.

10. A chain structure, characterized in that it comprises two load-bearing support plates (100) as described in claim 1, with the two load-bearing support plates (100) set oppositely and at least two rods (200) fixedly provided between the two load-bearing support plates (100).

11. A conveyor belt structure, characterized in that it is assembled from several chain structures as described in claim 10 and forms a closed-loop structure combining a spiral stacking form (300) with a linear form (400); in the spiral stacking form (300), in two load-bearing support plates (100) adjacent to each other at the top and bottom, the upper edge of the load-bearing support plate (100) located below supports the lower edge of the load-bearing support plate (100) located above in two adjacent load-bearing support plates (100).

\* \* \* \* \*